US012592110B2

(12) United States Patent
Lu

(10) Patent No.: US 12,592,110 B2
(45) Date of Patent: Mar. 31, 2026

(54) OUTER ASSEMBLY OF ELECTRIC LOCK

(71) Applicant: TAIWAN FU HSING INDUSTRIAL CO., LTD., Kaohsiung City (TW)

(72) Inventor: Shih-Min Lu, Kaohsiung City (TW)

(73) Assignee: TAIWAN FU HSING INDUSTRIAL CO., LTD., Kaohsiung City (TW)

( * ) Notice: Subject to any disclaimer, the term of this patent is extended or adjusted under 35 U.S.C. 154(b) by 43 days.

(21) Appl. No.: 18/626,931

(22) Filed: Apr. 4, 2024

(65) Prior Publication Data

US 2024/0346868 A1 Oct. 17, 2024

(30) Foreign Application Priority Data

Apr. 14, 2023 (TW) ................................ 112203465

(51) Int. Cl.
*G07C 9/00* (2020.01)

(52) U.S. Cl.
CPC ....... *G07C 9/00944* (2013.01); *G07C 9/0069* (2013.01)

(58) Field of Classification Search
USPC ........................................................ 70/278.1
See application file for complete search history.

(56) References Cited

U.S. PATENT DOCUMENTS 8,141,400 B2 * 3/2012 Sorensen .............. E05B 47/068 70/277
8,950,223 B1 * 2/2015 Joyce ..................... A45C 15/00 70/159
10,287,798 B2 * 5/2019 Huang ..................... E05B 49/00
10,385,588 B2 * 8/2019 Huang ................ E05B 47/0012
2003/0132829 A1 * 7/2003 Frolov ................. G07C 9/0069 340/5.7
2010/0257906 A1 * 10/2010 Sorensen .............. E05B 47/068 70/91
2013/0161051 A1 * 6/2013 Imamura ............ G07C 9/00944 174/50
2013/0241694 A1 * 9/2013 Sharma ................ H01Q 9/0407 340/5.64
2013/0298616 A1 * 11/2013 Ullrich ................ E05B 47/0012 70/278.1
2014/0041422 A1 * 2/2014 Chiou ................... E05B 47/068 292/144
2014/0250956 A1 * 9/2014 Chong .............. G07C 9/00944 70/278.1

(Continued)

FOREIGN PATENT DOCUMENTS

DE 102021133200 A1 * 6/2022 ......... G07C 9/00944

*Primary Examiner* — Nathan Cumar
(74) *Attorney, Agent, or Firm* — Muncy, Geissler, Olds & Lowe, P.C.

(57) ABSTRACT

An outer assembly of an electric lock includes an input module, a carrying base, a bottom case, and an outer case. The input module is configured to receive a user input. The carrying base is configured to support the input module. The bottom case has a plurality of engaging structures. The outer case has a front panel and a side wall bent relative to the front panel, and the side wall is formed with a plurality of recessed parts recessed inwardly relative to an outer side of the side wall for engaging with the plurality of engaging structures. An accommodation space is formed between the bottom case and the outer case for accommodating the input module and the carrying base.

11 Claims, 5 Drawing Sheets

(56) References Cited

U.S. PATENT DOCUMENTS

| | | | | |
|---|---|---|---|---|
| 2015/0279137 | A1* | 10/2015 | Bacon | E05B 81/66<br>70/278.1 |
| 2018/0016810 | A1* | 1/2018 | Bacon | E05B 81/66 |
| 2018/0266146 | A1* | 9/2018 | Huang | F16D 11/16 |
| 2018/0298639 | A1* | 10/2018 | Rais | E05B 47/0001 |
| 2019/0206167 | A1* | 7/2019 | Lu | G07C 9/0069 |
| 2024/0346868 | A1* | 10/2024 | Lu | G07C 9/0069 |

* cited by examiner

OUTER ASSEMBLY OF ELECTRIC LOCK

BACKGROUND OF THE INVENTION

1. Field of the Invention

The present invention relates to an outer assembly of an electric lock, and more particularly, to an outer assembly of an electric lock with improved structure.

2. Description of the Prior Art

Generally, an electric lock usually has an outer assembly and an inner assembly. The outer assembly of the electric lock is configured to be mounted to an outer side of a door panel, and the inner assembly is configured to be mounted to an inner side of a door panel. The outer assembly of the electric lock usually has an input module (such as a keypad module, a touch module or a wireless input module) configured to receive a user input. The inner assembly of the electric lock usually has a control circuit configured to control operations of the electric lock, and an internal power source configured to provide power required by the electric lock for performing the operations. In order to prevent the outer assembly of the electric lock from being damaged, a case of the outer assembly of the electric lock of the prior art is integrally formed and surface treated to enhance appearance. However, the aforementioned manufacturing process is complex and has higher production cost.

SUMMARY OF THE INVENTION

An outer assembly of an electric lock of the present invention comprises an input module, a carrying base, a bottom case and an outer case. The input module is configured to receive a user input. The carrying base is configured to support the input module. The bottom case is configured to be fixed to an outer side of a door panel, and the bottom case has a plurality of engaging structures. The outer case has a front panel and a side wall bent relative to the front panel. The side wall is formed with a plurality of recessed parts recessed inwardly relative to an outer side of the side wall for engaging with the plurality of engaging structures. An accommodation space is formed between the bottom case and the outer case for accommodating the input module and the carrying base.

In an embodiment of the present invention, the outer case is integrally formed by a metal material.

In an embodiment of the present invention, a slit is formed on the recessed part.

In an embodiment of the present invention, the input module comprises a keypad module arranged with a plurality of buttons, and a circuit board arranged with a plurality of button electrodes respectively corresponding to the plurality of buttons. Each of the button electrodes is configured to generate a button signal when a corresponding button is pressed. The front panel of the outer case is formed with a plurality of openings corresponding to the plurality of buttons.

In an embodiment of the present invention, the outer assembly of the electric lock further comprises a waterproof gasket configured to cover edges of the bottom case and the side wall.

In an embodiment of the present invention, the waterproof gasket comprises an annular main body configured to cover the edges of the bottom case and the side wall, and a plurality of engaging blocks protruded from the annular main body and configured to abut against the plurality of engaging structures.

In an embodiment of the present invention, the bottom case and the outer case are formed with notches respectively, and the waterproof gasket further comprises a sealing block protruded from the annular main body and configured to seal the notches.

In an embodiment of the present invention, the input module has at least one external power input electrode passing through the sealing block and configured to receive power from an external power source.

In an embodiment of the present invention, the outer assembly of the electric lock further comprises a fixing member passing through the bottom case and configured to fix the bottom case to the outer side of the door panel.

In contrast to the prior art, the outer assembly of the electric lock of the present invention is produced by combining the outer case integrally formed by metal and the bottom case made of metal to cover the input module and the carrying base there between, so as to prevent internal components of the outer assembly of the electric lock from being damaged. The bottom case and the outer case of the present invention have simpler production processes. Therefore, the outer assembly of the electric lock of the present invention has lower production cost. Moreover, the external power input electrode is configured to pass through the slit on the sealing block of the waterproof gasket to be exposed on the outer assembly. Therefore, the outer assembly of the electronic lock of present invention has better waterproof effect.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
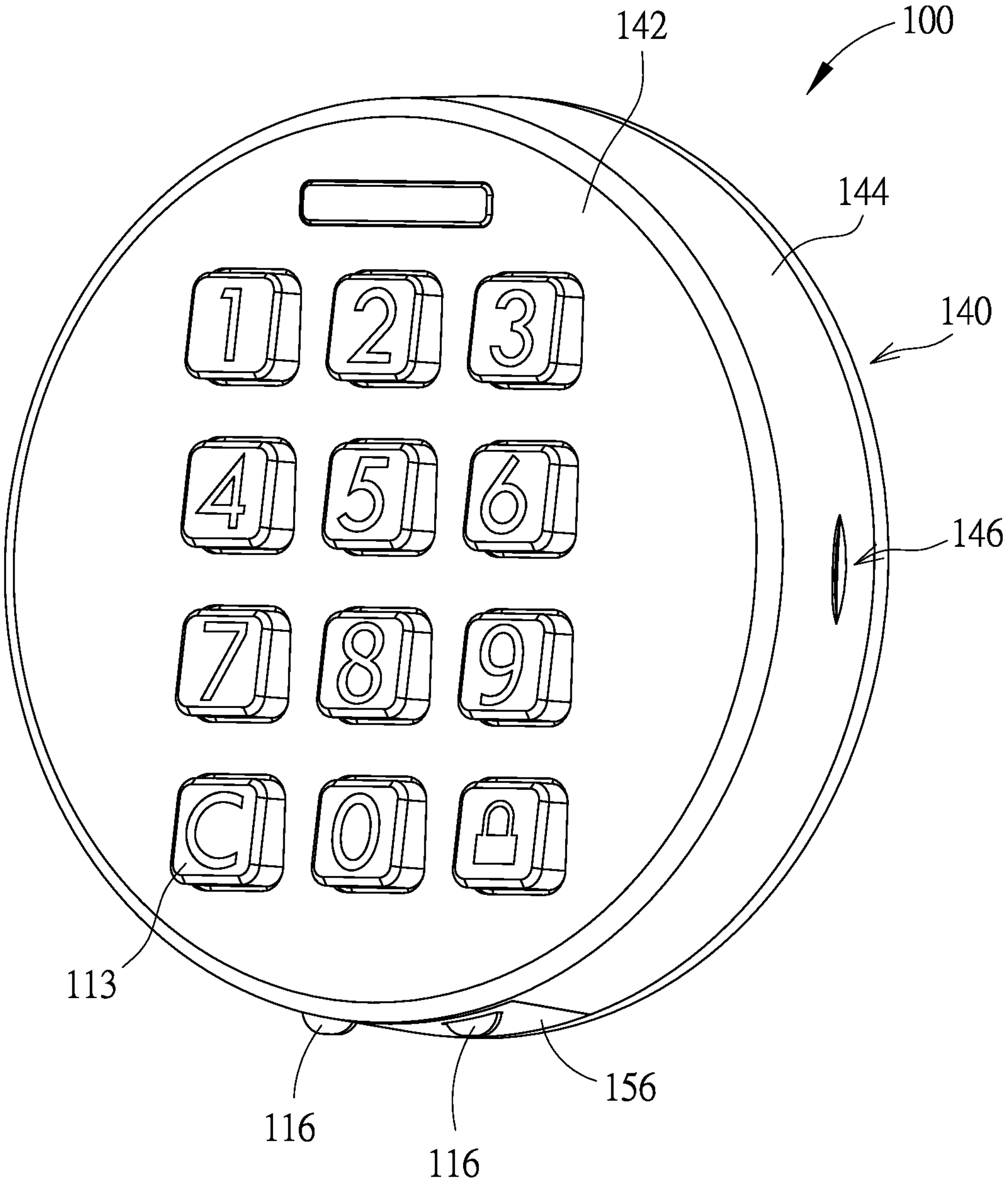
FIG. 1 is a diagram showing an outer assembly of an electric lock of the present invention.
Figure 2:
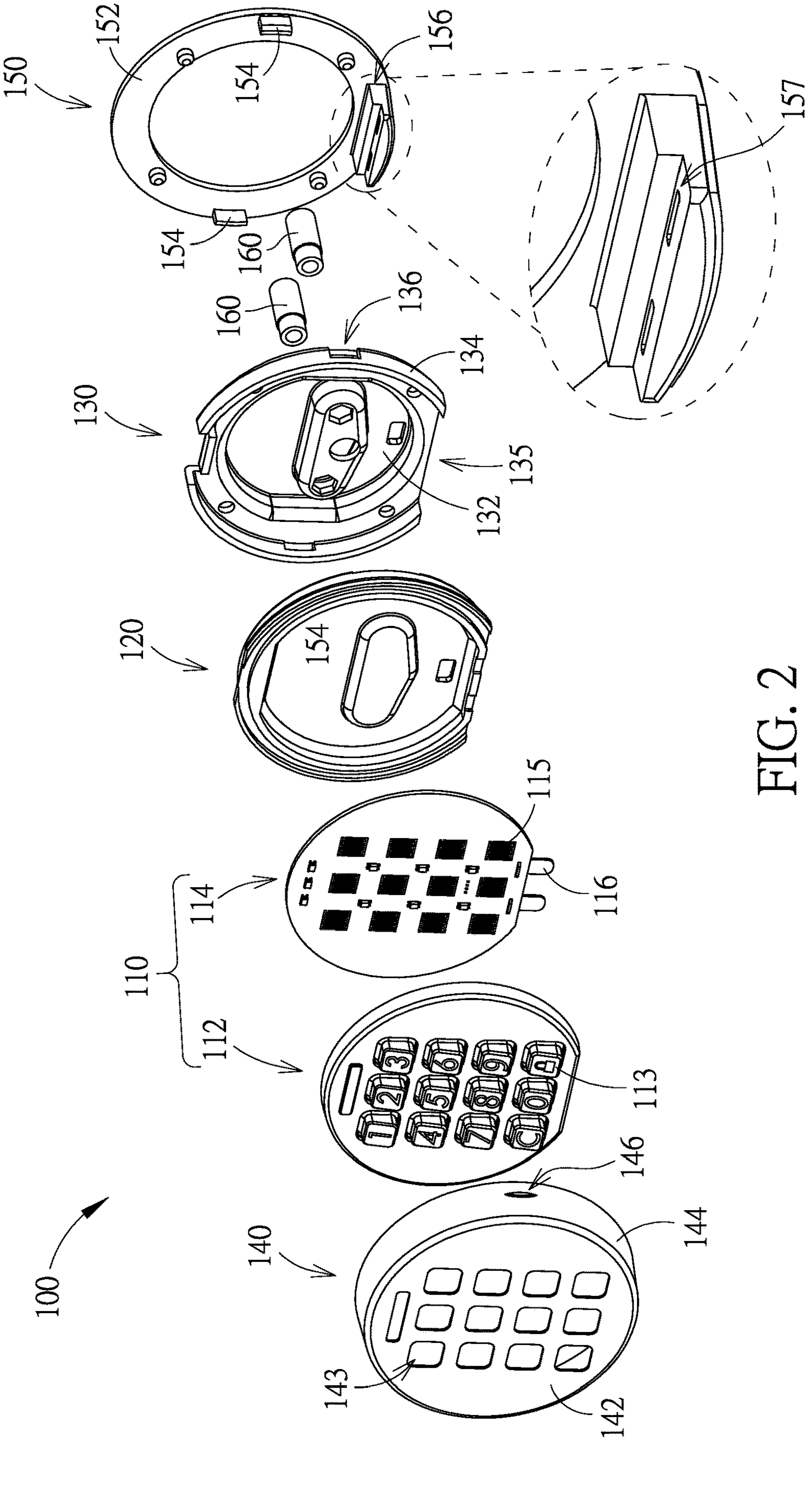
FIG. 2 is an exploded view of the outer assembly of the electric lock of the present invention.
Figure 3:
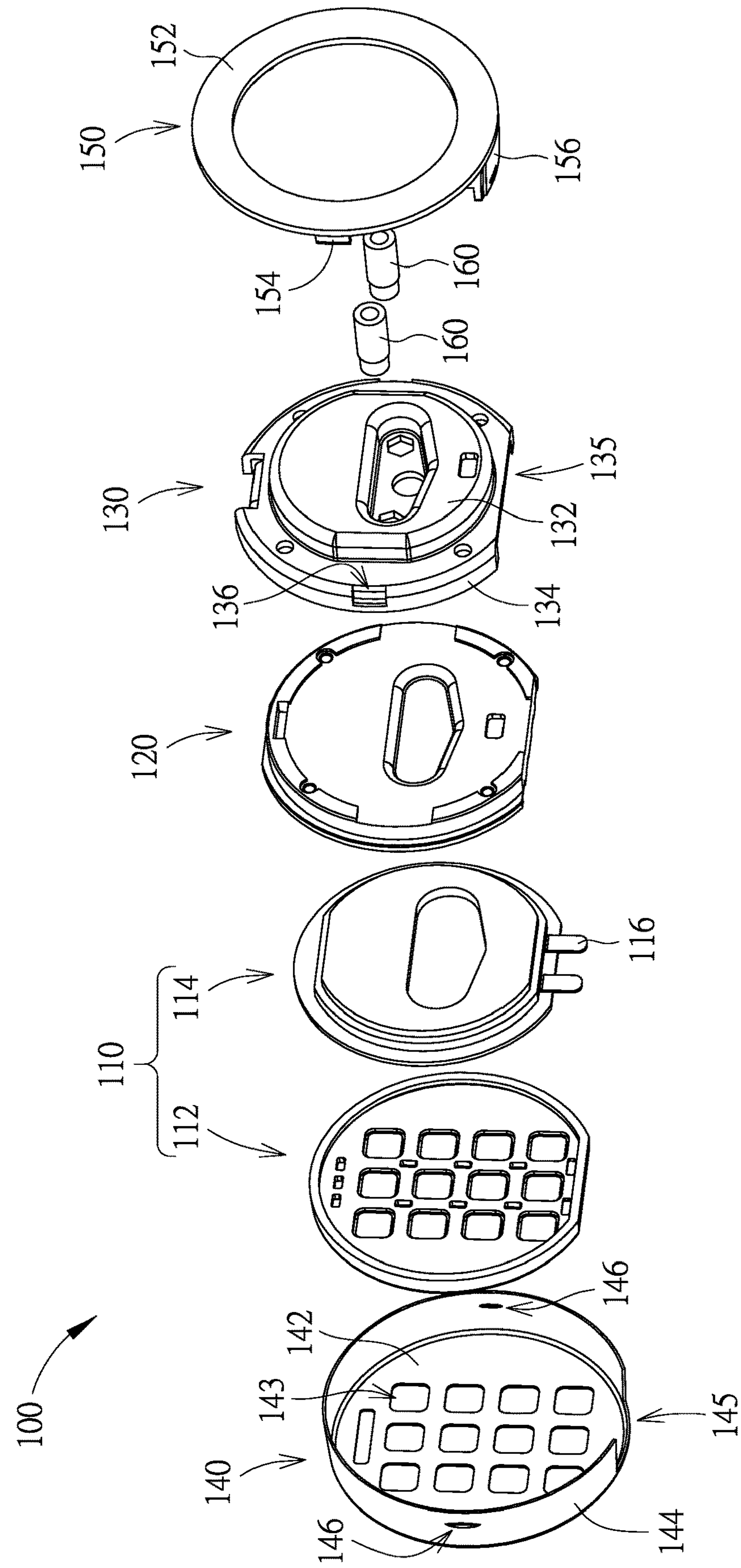
FIG. 3 is an exploded view of the outer assembly of the electric lock of the present invention in another viewing angle.
Figure 4:
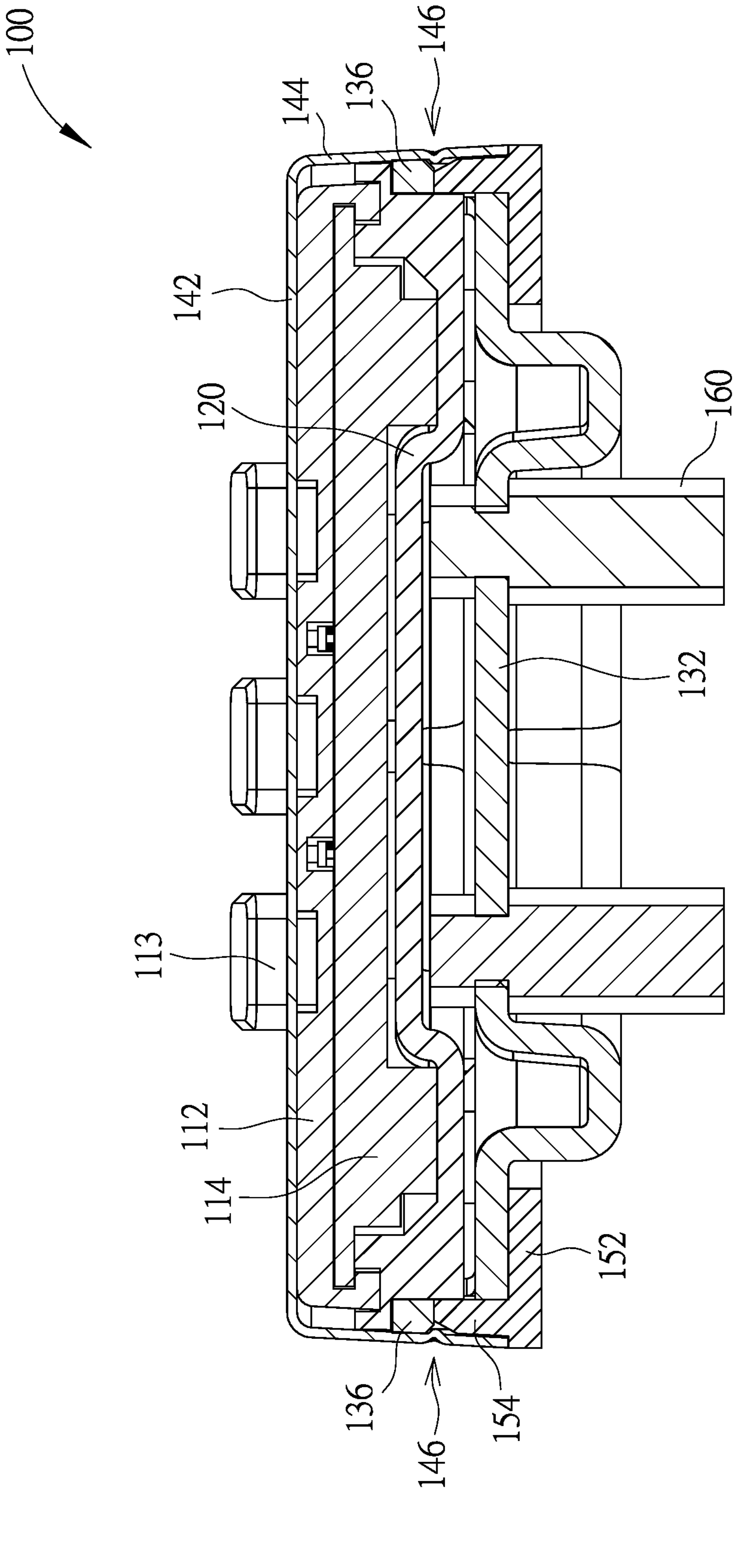
FIG. 4 is a cross-sectional view of the outer assembly of the electric lock of the present invention.

Please refer to FIG. 1 to FIG. 4. FIG. 1 is a diagram showing an outer assembly of an electric lock of the present invention, FIG. 2 is an exploded view of the outer assembly of the electric lock of the present invention, FIG. 3 is an exploded view of the outer assembly of the electric lock of the present invention in another viewing angle, FIG. 4 is a cross-sectional view of the outer assembly of the electric lock of the present invention. As shown in figures, the outer assembly 100 of the electric lock of the present invention comprises an input module 110, a carrying base 120, a bottom case 130, an outer case 140 and a waterproof gasket 150. The outer assembly 100 of the electric lock of the present invention is configured to be mounted to an outer side of a door panel for controlling personnel's access to space inside the door panel. In addition, the electric lock of the present invention can further comprises an inner assembly (not shown in the figures) configured to be mounted to an inner side of the door panel, and electrically connected to the outer assembly 100 of the electric lock. The inner assembly of the electric lock can comprises a control circuit configured to control operations of the electric lock, and an internal power source configured to provide power required by the electric lock for performing the operations.

The input module 110 is configured to receive a user input. In the present embodiment, the input module 110 comprises a keypad module 112 and a circuit board 114. The keypad module 112 is arranged with a plurality of buttons 113. Each of the buttons 113 is marked with a key character. The key character marked on the button 113 can be an Arabic numeral or a graphic symbol, but the present invention is not limited thereto. The circuit board 114 is arranged with a plurality of button circuits 115 respectively corresponding to the plurality of buttons 113. Each of the button circuits 115 is configured to generate a button signal when a corresponding button 113 is pressed. When the button signal generated by the keypad module 112 corresponding to or matching with a set of authentication data pre-stored in the control circuit, the control circuit is configured to control the electric lock to perform a predetermined operation, such as an unlocking operation or a locking operation.

The carrying base 120 is configured to support the input module 110. For example, when the button 113 of the keypad module 112 is pressed, the carrying base 120 is configured to support the keypad module 112 and the circuit board 114, in order to ensure that the button circuit 115 and an electrode on the corresponding button 113 can properly contact each other to generate the button signal.

The bottom case 130 comprises a bottom plate 132 and a lateral wall 134 surrounding the bottom plate 132. The bottom plate 132 is configured to be fixed to the outer side of the door panel. For example, the outer assembly 100 of the electric lock of the present invention can further comprises at least one fixing member 160 passing through the bottom plate 132 of the bottom case 130 and configured to fix the bottom case 130 to the outer side of the door panel. In the present embodiment, the outer assembly 100 of the electric lock comprises two fixing member 160, but the present invention is not limited thereto. The bottom case 130 further comprises a plurality of engaging structures 136 arranged on the lateral wall 134.

The outer case 140 has a front panel 142 and a side wall 144 bent relative to the front panel 142. The front panel 142 of the outer case 140 is formed with a plurality of openings 143 corresponding to the plurality of buttons 113 of the keypad module 112, in order to expose the plurality of buttons 113 of the keypad module 112. The side wall 144 of the outer case 140 corresponds to the lateral wall 134 of the bottom case 130. The side wall 144 is formed with a plurality of recessed parts 146 recessed inwardly relative to an outer side of the side wall 144 (or protruded inwardly relative to an inner side of the side wall 144 as shown in FIG. 4). The plurality of recessed parts 146 on the side wall 144 of the outer case 140 respectively correspond to the plurality of engaging structures 136 on the lateral wall 134 of the bottom case 130. When the outer case 140 is combined with the bottom case 130, the recessed parts 146 on the side wall 144 of the outer case 140 (can be regarded as protrusion parts at the inner side of the side wall 144 of the outer case 140) are configured to be engaged with the engaging structures 136 on the lateral wall 134 of the bottom case 130, in order to fix the outer case 140 to the bottom case 130. Moreover, an accommodation space is formed between the bottom case 130 and the outer case 140 for accommodating the input module 110 and the carrying base 120. In the present embodiment, the outer case 140 can be integrally formed by a metal material. Foe example, the outer case 140 can be formed by stamping a metal plate, but the present invention is not limited to this. On the other hand, the plurality of recessed parts 146 on the side wall 144 can also be formed by stamping.

The waterproof gasket 150 comprises an annular main body 152 and a plurality of engaging blocks 154. The annular main body 152 is configured to cover edges of the bottom case 130 and the side wall 144. The plurality of engaging blocks 154 is protruded from the annular main body 152. The plurality of engaging blocks 154 of the waterproof gasket 150 respectively correspond to the plurality of engaging structures 136 of the bottom case 130. When the outer case 140 is combined with the bottom case 130, the engaging block 154 is configured to abut against a corresponding engaging structure 136, in order to prevent water or liquid from entering inside of the outer assembly 100 of the electronic lock from a gap between the engaging structure 136 and the recessed part 146.

In addition, the lateral wall 134 of the bottom case 130 and the side wall 144 of the outer case 140 are formed with notches 135, 145 respectively. The waterproof gasket 150 further comprises a sealing block 156 protruded from the annular main body 152 and configured to seal the notch 135 on the lateral wall 134 of the bottom case 130 and the notch 145 on the side wall 144 of the outer case 140. On the other hand, the circuit board 114 of the input module 110 is arranged with at least one external power input electrode 116. In the present embodiment, the circuit board 114 is arranged with two external power input electrode 116 configured to receive power from an external power source. When the power provided by the internal power source of the inner assembly of the electric lock of the present invention is insufficient, the external power input electrodes 116 can be electrically connected to an external power source (such as a battery) to receive power of the external power source to allow the electric lock to operate normally. In the present embodiment, the external power input electrode 116 is a metal sheet passing through a slit 157 on the sealing block 156 to be exposed on the outer assembly 100 of the electronic lock of the present invention.

According to the above arrangement, the outer assembly 100 of the electric lock of the present invention is produced by combining the outer case 140 integrally formed by metal and the bottom case 130 made of metal to cover the input module 110 and the carrying base 120 there between, so as to prevent internal components of the outer assembly 100 of the electric lock from being damaged. The bottom case 130 and the outer case 140 of the present invention have simpler production processes. In the present embodiment, the outer case 140 can be made by stamping. The input module 110 can be covered by the metal outer case 140 and the metal bottom base 130, so as to increase structural strength. In contrast to the prior art, the outer case 140 of the present invention can has sufficient structural strength to protect the input module 110 even if the outer case 140 made by stamping has a smaller thickness. Therefore, the outer assembly 100 of the electric lock of the present invention has lower production cost. Moreover, the external power input electrode 116 is configured to pass through the slit on the sealing block 156 of the waterproof gasket 150 to be exposed on the outer assembly 100. Therefore, the outer assembly 100 of the electronic lock of present invention has better waterproof effect.

Figure 5:
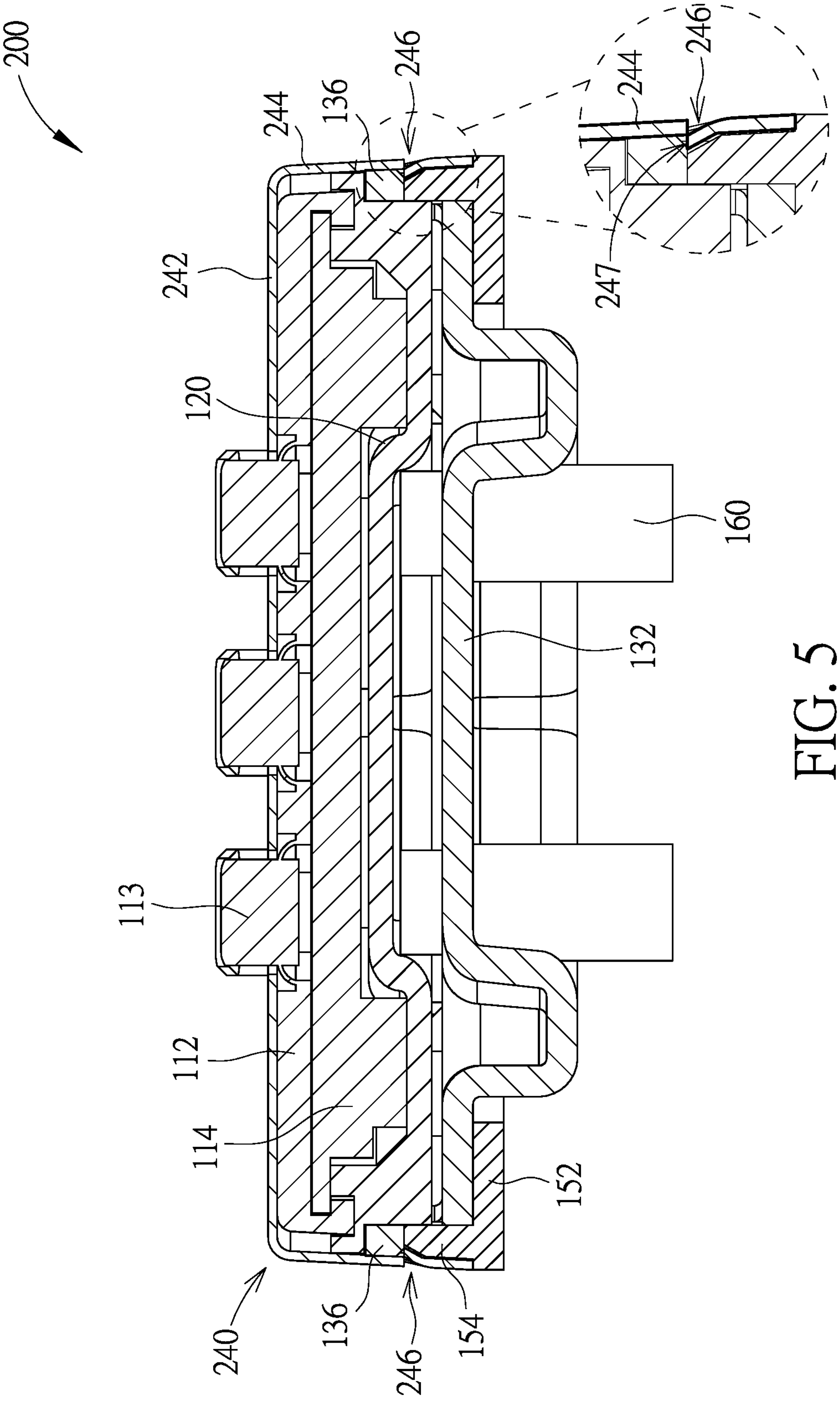
FIG. 5 is a cross-sectional view of an outer assembly of an electric lock of another embodiment of the present invention.

Please refer to FIG. 5. FIG. 5 is a cross-sectional view of an outer assembly of an electric lock of another embodiment of the present invention. The input module 110, the carrying base 120, the bottom case 130, the waterproof gasket 150 and the fixing members 160 of the outer assembly 200 of the electric lock in FIG. 5 are identical to the input module 110, the carrying base 120, the bottom case 130, the waterproof gasket 150 and the fixing members 160 of the outer assembly 100 of the electric lock in FIG. 4, thus no further illustration is provided. Different from the outer case 140 in FIG. 4, a slit 247 is formed on a recessed part 246 of the outer case 240 in FIG. 5. For example, the outer case 240 can be formed by stamping a metal plate, and a plurality of recessed parts 246 on a side wall 244 can also be formed by stamping. When forming the recessed part 246, a portion between the recessed part 246 and the side wall 244 is broken during the stamping process to form a slit 247 on an edge of the recessed part 246.

According to the above arrangement, an angle between the edge of the recessed part 246 and the side wall 244 is close to 90 degrees. As such, when the outer case 140 is combined with the bottom case 130, the recessed part 246 can be more stably engaged with the engaging structure 136 of the lateral wall 134 of the bottom case 130. On the other hand, the recessed part 246 in the present embodiment is formed by stamping after the outer case 140 is combined with the bottom case 130, such that combination of the outer case 140 and the bottom case 130 is more stable and is harder to be damaged or separated. Moreover, when forming the recessed part 246, the recessed part 246 is configured to abut against and press the engaging block 154 of the waterproof gasket 154, so as to enhance waterproof effect.

On the other hand, in other embodiments of the present invention, the input module 110 can receive the user input in other ways. For example, the input module 110 can be a touch module for receiving a touch input of the user; or the input module 110 can be a wireless input module (Bluetooth module or near field communication module, etc.) configured to receive a wireless input of the user.

In contrast to the prior art, the outer assembly 100, 200 of the electric lock of the present invention is produced by combining the outer case 140, 240 integrally formed by metal and the bottom case 130 made of metal to cover the input module 110 and the carrying base 120 there between, so as to prevent internal components of the outer assembly 100, 200 of the electric lock from being damaged. The bottom case 130 and the outer case 140, 240 of the present invention have simpler production processes. Therefore, the outer assembly 100, 200 of the electric lock of the present invention has lower production cost. Moreover, the external power input electrode 116 is configured to pass through the slit on the sealing block 156 of the waterproof gasket 150 to be exposed on the outer assembly 100, 200. Therefore, the outer assembly 100, 200 of the electronic lock of present invention has better waterproof effect.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An outer assembly of an electric lock, comprising:
an input module configured to receive a user input;
a carrying base configured to support the input module;
a bottom case configured to be fixed to an outer side of a door panel, wherein the bottom case has a plurality of engaging structures; and
an outer case having a front panel and a side wall bent relative to the front panel, wherein the side wall is formed with a plurality of recessed parts recessed inwardly relative to an outer side of the side wall for engaging with the plurality of engaging structures, an accommodation space is formed between the bottom case and the outer case for accommodating the input module and the carrying base;
wherein the recessed part is formed by stamping after the outer case is combined with the bottom case.

2. The outer assembly of the electric lock of claim 1, wherein the outer case is integrally formed by a metal material.

3. The outer assembly of the electric lock of claim 1, wherein a slit is formed on the recessed part.

4. The outer assembly of the electric lock of claim 1, wherein the input module comprises:
a keypad module arranged with a plurality of buttons; and
a circuit board arranged with a plurality of button circuits respectively corresponding to the plurality of buttons, wherein each of the button circuits is configured to generate a button signal when a corresponding button is pressed;
wherein the front panel of the outer case is formed with a plurality of openings corresponding to the plurality of buttons.

5. The outer assembly of the electric lock of claim 1, further comprising a waterproof gasket configured to cover edges of the bottom case and the side wall.

6. The outer assembly of the electric lock of claim 5, wherein the waterproof gasket comprises:
an annular main body configured to cover the edges of the bottom case and the side wall; and
a plurality of engaging blocks protruded from the annular main body and configured to abut against the plurality of engaging structures.

7. The outer assembly of the electric lock of claim 6, wherein the bottom case and the outer case are formed with notches respectively, the waterproof gasket further comprises a sealing block protruded from the annular main body and configured to seal the notches.

8. The outer assembly of the electric lock of claim 7, wherein the input module has at least one external power input electrode passing through the sealing block and configured to receive power from an external power source.

9. The outer assembly of the electric lock of claim 1, further comprising a fixing member passing through the bottom case and configured to fix the bottom case to the outer side of the door panel.

10. An outer assembly of an electric lock, comprising:
an input module configured to receive a user input;
a carrying base configured to support the input module;
a bottom case configured to be fixed to an outer side of a door panel, wherein the bottom case has a plurality of engaging structures; and
an outer case having a front panel and a side wall bent relative to the front panel, wherein the side wall is formed with a plurality of recessed parts recessed inwardly relative to an outer side of the side wall for engaging with the plurality of engaging structures, an accommodation space is formed between the bottom case and the outer case for accommodating the input module and the carrying base;
wherein a slit is formed on the recessed part.

11. An outer assembly of an electric lock, comprising:

an input module configured to receive a user input;

a carrying base configured to support the input module;

a bottom case configured to be fixed to an outer side of a door panel, wherein the bottom case has a plurality of engaging structures;

an outer case having a front panel and a side wall bent relative to the front panel, wherein the side wall is formed with a plurality of recessed parts recessed inwardly relative to an outer side of the side wall for engaging with the plurality of engaging structures, an accommodation space is formed between the bottom case and the outer case for accommodating the input module and the carrying base; and a waterproof gasket configured to cover edges of the bottom case and the side wall, the waterproof gasket comprising an annular main body configured to cover the edges of the bottom case and the side wall, and a plurality of engaging blocks protruded from the annular main body and configured to abut against the plurality of engaging structures;

wherein the bottom case and the outer case are formed with notches respectively, the waterproof gasket further comprises a sealing block protruded from the annular main body and configured to seal the notches.

* * * * *